US012559066B2

(12) United States Patent
Weh et al.

(10) Patent No.: US 12,559,066 B2
(45) Date of Patent: Feb. 24, 2026

(54) HYDRAULIC UNIT OF A VEHICLE BRAKING SYSTEM WITH AN ADAPTER

(71) Applicant: Robert Bosch GmbH, Stuttgart (DE)

(72) Inventors: Andreas Weh, Sulzberg (DE); Johji Naka, Kempten (DE); Juergen Tandler, Fuessen (DE); Matthias Mayr, Rettenberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 383 days.

(21) Appl. No.: 18/304,916

(22) Filed: Apr. 21, 2023

(65) Prior Publication Data

US 2024/0017700 A1     Jan. 18, 2024

(30) Foreign Application Priority Data

Jul. 15, 2022     (DE) ..................... 10 2022 207 238.3

(51) Int. Cl.
*B60T 7/04* (2006.01)
*B60T 13/74* (2006.01)

(52) U.S. Cl.
CPC .............. *B60T 7/04* (2013.01); *B60T 13/745* (2013.01)

(58) Field of Classification Search
CPC ........ B60T 7/04; B60T 13/745; B60T 8/4072; B60T 7/042; B60T 13/12
See application file for complete search history.

(56) References Cited

U.S. PATENT DOCUMENTS

2016/0121864 A1*   5/2016   Misunou ................. B60T 11/26
                                                           60/591
2020/0216049 A1*   7/2020   Alili ........................ B60T 11/26
2021/0129816 A1*   5/2021   Weh ........................ B60T 13/66
2023/0406277 A1*  12/2023   Weh ...................... B60T 11/102

* cited by examiner

*Primary Examiner* — Pamela Rodriguez
(74) *Attorney, Agent, or Firm* — NORTON ROSE FULBRIGHT US LLP

(57) ABSTRACT

In a hydraulic unit of a vehicle braking system with a hydraulic housing and an adapter arranged thereon for coupling a pedal travel transducer to the hydraulic housing, an interface plate for fastening the pedal travel transducer is provided on the adapter. The interface plate is designed with a self-centering mechanism for precisely aligning the interface plate relative to the adapter.

8 Claims, 4 Drawing Sheets

HYDRAULIC UNIT OF A VEHICLE BRAKING SYSTEM WITH AN ADAPTER

CROSS REFERENCE

The present application claims the benefit under 35 U.S.C. § 119 of German Patent Application No. DE 10 2022 207 238.3 filed on Jul. 15, 2022, which is expressly incorporated herein by reference in its entirety.

FIELD

The present invention relates to a hydraulic unit of a vehicle braking system with a hydraulic housing and an adapter arranged thereon for coupling a pedal travel transducer to the hydraulic housing, wherein an interface plate for fastening the pedal travel transducer is provided on the adapter.

BACKGROUND INFORMATION

Vehicle braking systems of motor vehicles comprise a hydraulic unit that provides controlled brake pressures to associated braking systems. A controlled brake pressure is primarily required in vehicle control systems, such as an anti-lock braking system (ABS), anti-slip control (ASR), and/or electronic stability program (ESP). For this purpose, the hydraulic unit comprises various hydraulic components, such as valves and also a plunger or power cylinder, in a hydraulic housing.

By means of the plunger, brake pressure is generated by an power piston. The plunger is to be controlled by a pedal travel transducer coupled to the hydraulic housing by means of an adapter. The pedal travel transducer is thus fixed on the hydraulic housing.

Depending on the type of vehicle braking system, different pedal travel transducers are used so that it can be ensured that corresponding adapters can hold different pedal travel transducers in the correct position.

Such different pedal travel transducers thus require different brackets that are as cost-effective as possible, reliable and at the same time easy to mount and with which the transducers can be fastened to the hydraulic housing of an associated hydraulic unit in order to thus be integrated appropriately into the respective vehicle braking system in the vehicle.

SUMMARY

According to an example embodiment of the present invention, a hydraulic unit of a vehicle braking system with a hydraulic housing and an adapter arranged thereon for coupling a pedal travel transducer to the hydraulic housing is provided, wherein an interface plate for fastening the pedal travel transducer is provided on the adapter. Furthermore, the interface plate is designed with a self-centering mechanism for precisely aligning the interface plate relative to the adapter.

With the solution according to the present invention, a precise alignment of an interface plate relative to an adapter is created, which results in various advantages. On the one hand, a defined tolerance situation is achieved between the interface plate and the adapter, which is in particular advantageous in the case of a rotation rate sensor provided on the hydraulic unit. Furthermore, defined packaging tolerances are provided for the vehicle manufacturer during the installation of the hydraulic unit according to the present invention.

According to an example embodiment of the present invention, the self-centering mechanism is advantageously provided with a first centering feature on the adapter for fixing the X-Y position of the interface plate in the main plane thereof. The first centering feature is advantageously designed as a point-to-point fit. The point-to-point fit is preferably designed with a point-shaped elevation formed on the adapter and a point-shaped hole formed in the interface plate.

According to an example embodiment of the present invention, furthermore, the self-centering mechanism is advantageously provided with a second centering feature on the adapter for fixing the rotational position or rotational alignment of the interface plate in the main plane thereof. The second centering feature is advantageously designed as a point-to-line fit. The point-to-point fit is preferably designed with a point-shaped elevation formed on the adapter and a line-shaped hole formed in the interface plate. The elevation is preferably created as a circular dome or a circular ridge on the adapter.

In addition, a bevel on the adapter and a correspondingly designed embossment on the interface plate are advantageously formed at said elevations. As a result, the two components, i.e., the adapter and the interface plate, are also matched to one another with respect to their shaping in these areas and can thus be positioned better. By means of an embossment on the interface plate, the necessary clearance in the area of radii of the respective elevation on the adapter is in particular reduced.

In the hydraulic unit according to the present invention, a seal that seals between the hydraulic housing and the interface plate is also preferably formed. The seal of this type is thus designed to span or bridge the adapter, which improves the tightness overall. Furthermore, due to the improved tolerance with unchanged large installation space requirement for the components involved, i.e., the adapter and the interface plate, larger sealing widths for the seal of this type are required.

According to the present invention, it is also preferred that with regard to its contact surface abutting against the adapter, the interface plate is designed with a larger surface contour than that of the associated contact surface of the adapter. The interface plate according to the present invention thus preferably covers or overlaps the adapter completely and also has sufficient space, in particular width, for a sealing bead around the adapter.

The adapter of the hydraulic unit according to an example embodiment of the present invention is preferably designed with an adapter mandrel that passes through the interface plate, wherein a clearance fit is formed between the interface plate and the adapter mandrel.

According to an example embodiment of the present invention, the interface plate is also preferably designed as a deep-drawn component. Furthermore, the adapter is preferably also designed as a deep-drawn component.

In the interface plate, screw holes are also advantageously formed, through which screws are screwed with a clearance fit directly into the hydraulic housing. Such screws have a particularly large screw head support because the solution according to the present invention creates an improved tolerance situation between the adapter and the interface plate. More preload or an increased bolting torque is also possible for such screws.

An exemplary embodiment of the solution according to the present invention is explained below with reference to the figures.

DETAILED DESCRIPTION OF EXAMPLE EMBODIMENTS

Figures 1, 2:
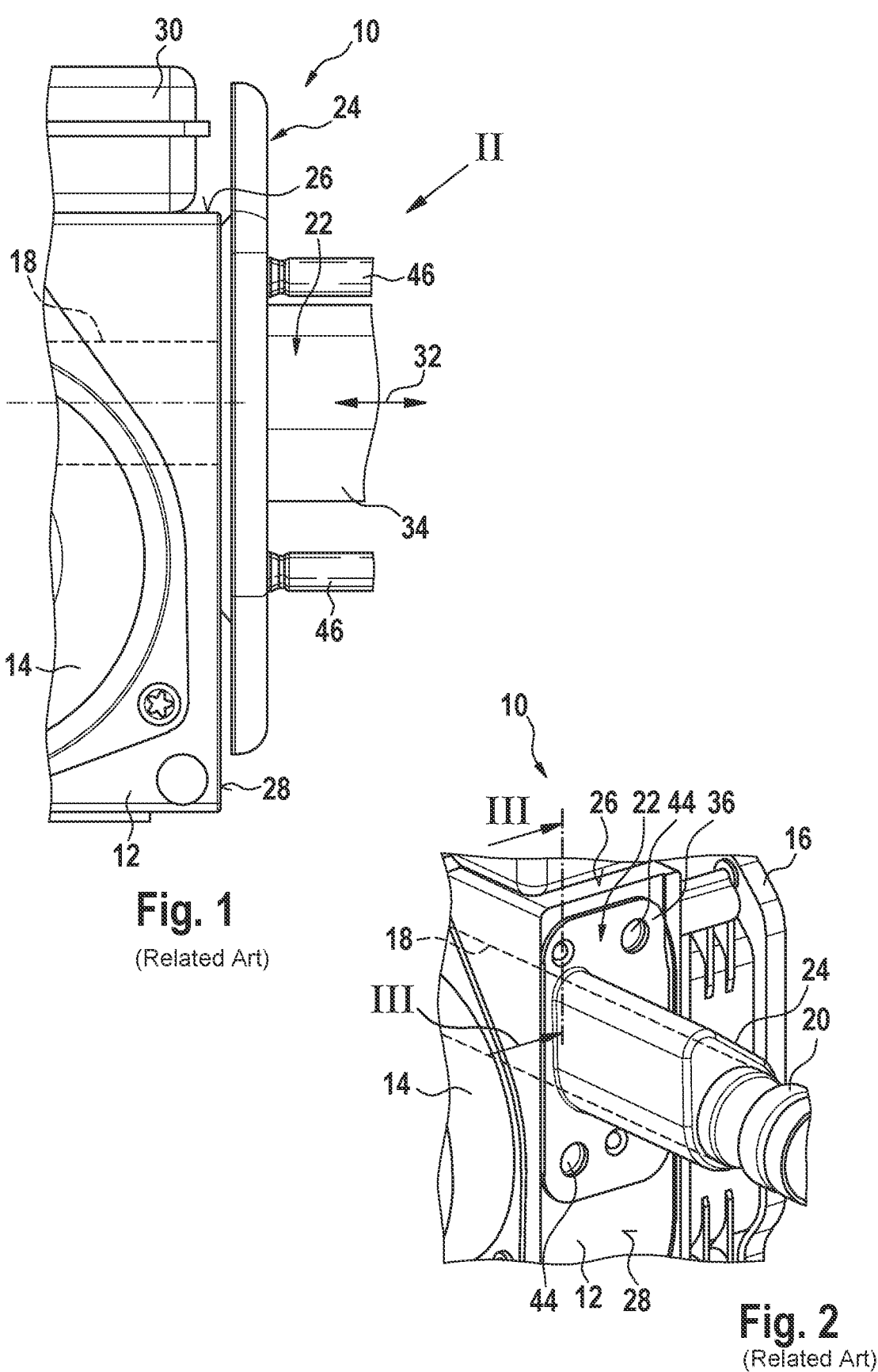
FIG. 1 shows a side view of a hydraulic unit according to the related art with a hydraulic housing, an adapter, and an interface plate.
FIG. 2 shows the view II according to FIG. 1 with the interface plate not mounted.
Figure 3:
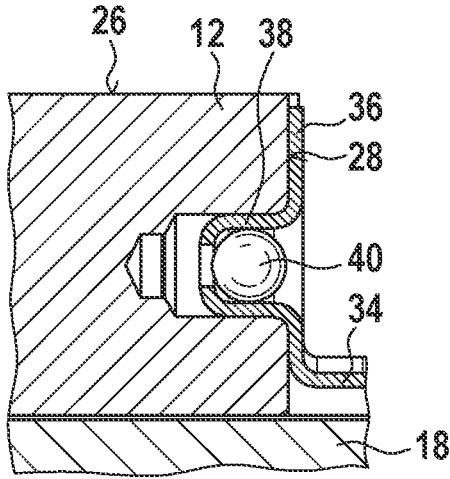
FIG. 3 shows the section III-III according to FIG. 2 in an enlarged view.
Figure 4:
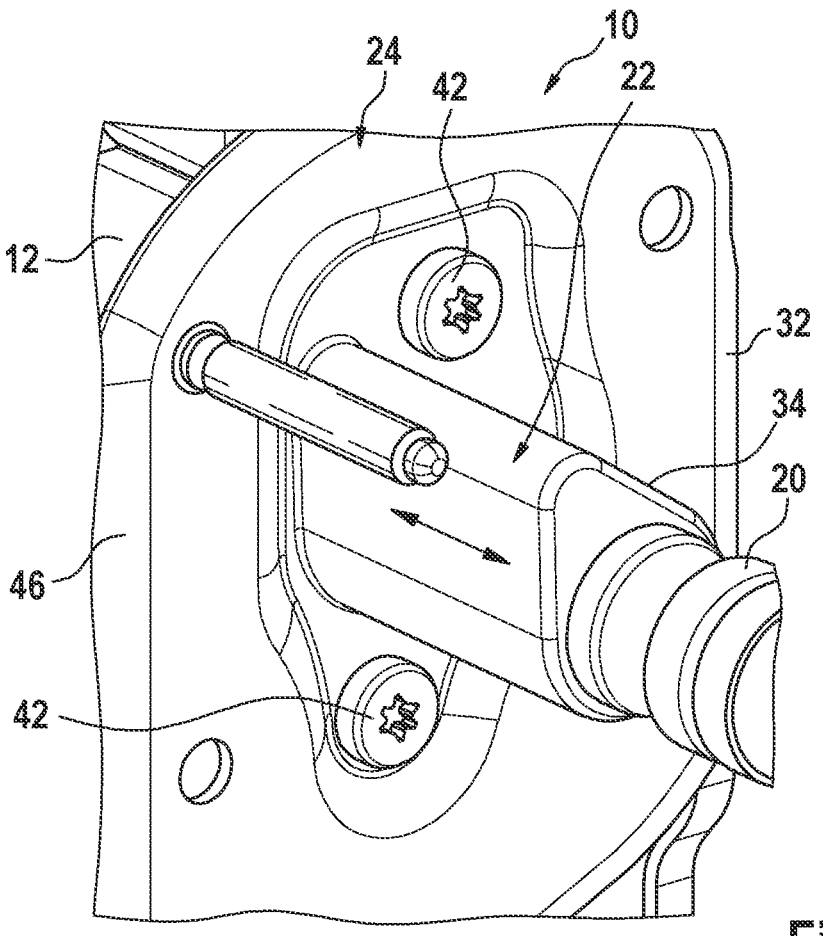
FIG. 4 shows the view II according to FIG. 1 with the interface plate mounted.

In FIGS. 1 to 4, a hydraulic unit 10 of a hydraulic, vehicle power braking system (not illustrated further) with a slip control is provided. Such slip controls are, for example, anti-lock controls, traction slip controls, and/or vehicle dynamics controls/electronic stability programs for which the abbreviations ABS, ASR, and/or FDR/ESP are common.

The hydraulic unit 10 comprises a hydraulic block or a hydraulic housing 12, which is designed as a comparatively narrow, cuboid metal block made of an aluminum alloy. The hydraulic housing 12 serves as a mechanical fastening and hydraulic circuitry of hydraulic components of the slip control, including a brake pressure control of the vehicle power braking system. Such hydraulic components include solenoid valves, check valves, hydraulic accumulators, damper chambers, and pressure sensors, which are fastened in receptacles in the hydraulic housing 12. The receptacles are cylindrical depressions, blind holes and/or also through-holes which may have diameter steps and into which the hydraulic components are introduced and are fastened or being fastened in a pressure-tight manner by, for example, a circumferential caulking. The hydraulic components may be recessed in the receptacles or protrude from the hydraulic housing 12.

The hydraulic housing 12 is furthermore equipped with an electric motor 14, an electronic control unit 16, an power brake pressure generator or plunger 18 as well as a pedal travel transducer 20. The pedal travel transducer 20 is coupled to the hydraulic housing 12 in a stationary and force-transmitting manner by means of an adapter 22 and an interface plate 24.

Hydraulic circuitry means that the receptacles for the hydraulic components are connected to one another by conduits (not shown) passing through the hydraulic housing 12 according to a hydraulic diagram of the vehicle power braking system or the slip control thereof. The receptacles and conduits form a so-called "bore" of the hydraulic housing 12, wherein the receptacles and conduits can in principle also be produced in a manner other than by drilling. The hydraulic housing 12 is drilled at right angles, which means that the receptacles for the hydraulic components and the conduits connecting them are parallel and perpendicular to one another and to sides and edges of the cuboid hydraulic housing 12.

The hydraulic housing 12 accordingly has a receiving bore for the plunger 18, which bore extends parallel to an upper side 26 of the hydraulic housing 12. The plunger 18 arranged in this manner is accessible from the outside of the pedal travel transducer 20, which is attached to a front side 28 of the hydraulic housing 12 at the height of the receiving bore for the plunger 18 by means of the adapter 22 and the interface plate 24. A brake fluid reservoir 32 is also placed on the upper side 26 of the hydraulic housing 12.

By means of a brake pedal or brake lever (not shown), the pedal travel transducer 20, which passes its position change 32 to the plunger 18, can be operated by a user of the associated vehicle.

The adapter 22 is cup-shaped or hat-shaped with an adapter mandrel 34 and has, at its open end, a substantially rectangular, planar mounting flange 36, with which it abuts against and is fastened to the front side 28 of the hydraulic housing 12.

The mounting flange 36 comprises two hollow pins 38, which are opposite one another, project into blind holes in the front side 28 of the hydraulic housing 12 and are held therein in a clamping manner. The clamping force is increased by a ball 40, which is pressed into a respectively associated hollow pin 38 and expands the hollow pin 38 so that it is held in an associated blind hole of the hydraulic housing 12. The balls 40 form expansion elements that ensure that the adapter 22 does not move relative to the hydraulic housing 12. One of the two hollow pins 38 with a pressed-in ball 40 as an expansion element is illustrated in more detail in FIG. 3.

The adapter 22 with its adapter mandrel 34 and its mounting flange 36 is a deep-drawn component made of sheet metal, as a result of which the mounting flange 36 is thin, which allows fastening of the hydraulic housing 12 and of the associated components close to a bulkhead of a vehicle, for example.

After fastening the adapter 22 to the front side 28 of hydraulic housing 12, the interface plate 24 designed in the form of a perforated plate is placed onto the mounting flange 36 and fastened to the hydraulic housing 12 with screws 42. The interface plate 24 has a through-hole 44 for the passage of the adapter mandrel 34 of the adapter 22, the contour of said through-hole substantially following the cross-sectional shape of the adapter mandrel 34. Stud bolts 46 for fastening to the bulkhead of the associated vehicle project from the interface plate 24.

Figure 5:
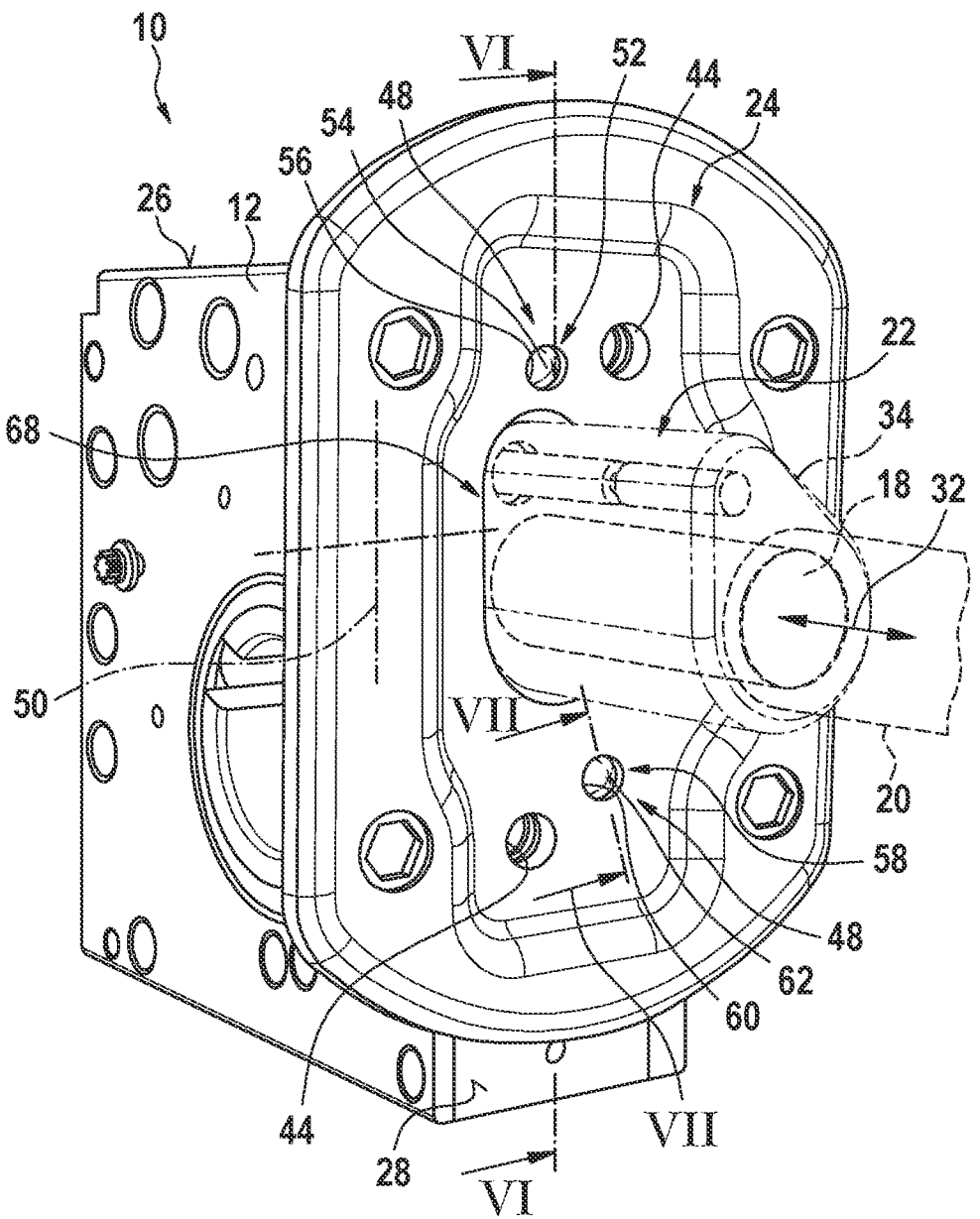
FIG. 5 shows a perspective view of an exemplary embodiment of a hydraulic unit according to the present invention.
Figures 6, 7:
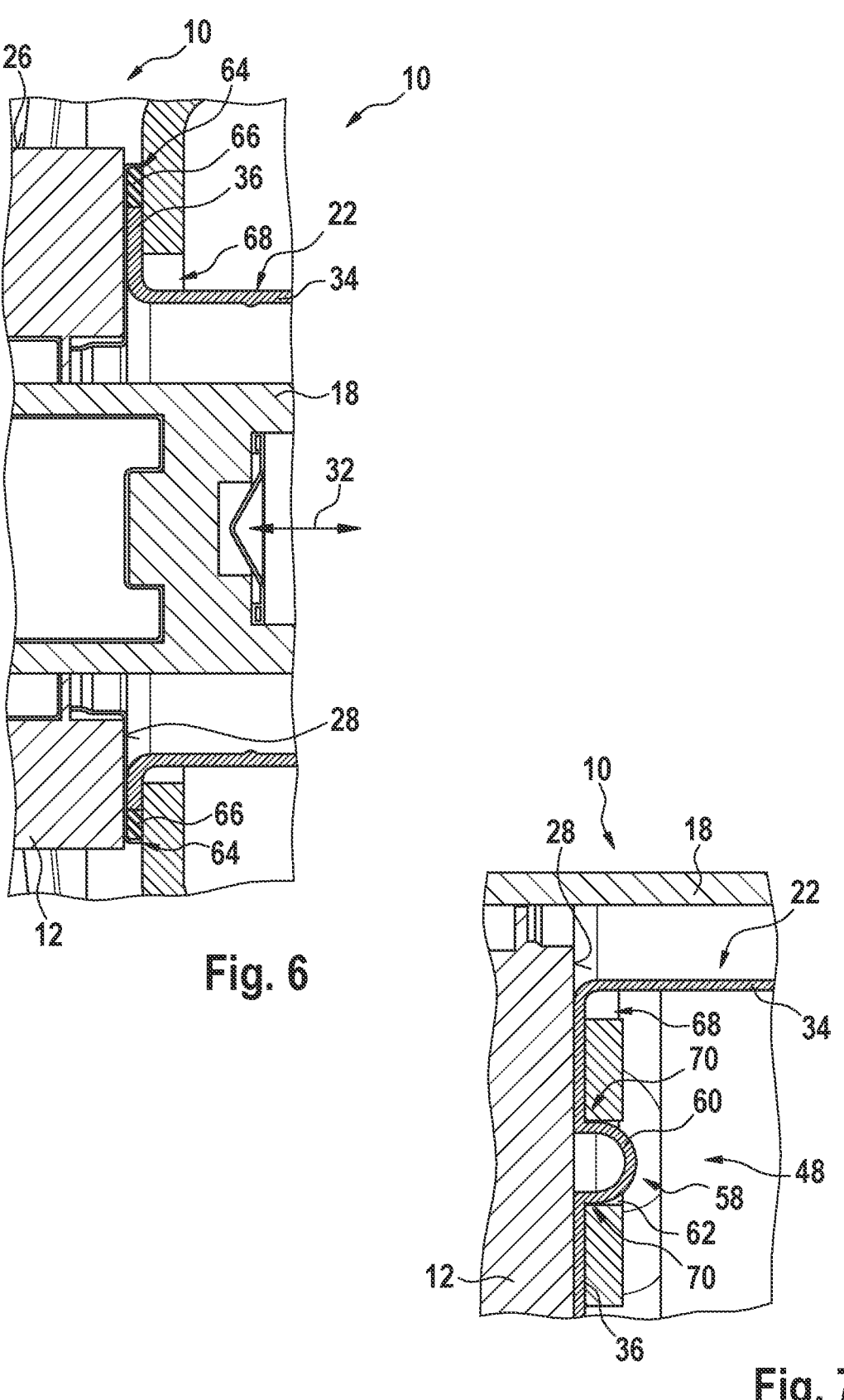
FIG. 6 shows the section VI-VI according to FIG. 5 in an enlarged view.
FIG. 7 shows the section VII-VII according to FIG. 5 in a further enlarged view.

FIGS. 5 to 7 show a hydraulic unit 10 in which an interface plate 24 for a pedal travel transducer (not shown) is likewise attached in a stationary manner to a cuboid hydraulic housing 12 by means of an adapter 22.

The interface plate 24, likewise designed as a perforated plate, is designed as a flat deep-drawn component and is designed with a self-centering mechanism 48 for precisely aligning the interface plate 24 in the main plane 50 thereof relative to the adapter 22.

The self-centering mechanism 48 is designed with a first centering feature 52 in the form of a point-to-point fit, wherein a point-shaped elevation 54 in the form of a circular dome is formed on the mounting flange 36 of the adapter 22 and an associated, precisely-fitted point-shaped hole 56 is formed in the flat interface plate 24. X-Y positioning of the interface plate 24 relative to the adapter 22 is thus possible. By means of a second centering feature 58 in the form of a point-to-line fit, it is also possible to fix the rotational position of the interface plate 24 relative to the adapter 22. For this purpose, a second point-shaped elevation 60 in the form of a further circular dome is formed on the mounting flange 36 of the adapter 22 and an associated, precisely arranged, linear hole 62 is formed in the interface plate 24.

The interface plate 24 according to FIGS. 5 to 7 is furthermore designed with such a large protrusion relative to the surface of the mounting flange 36 of the adapter 22 that a circumferential groove 64 is formed around the mounting flange 36 between the front side 28 of the hydraulic housing 12 and the interface plate 24. An annular seal 66, which seals between the front side 28 of the hydraulic housing 12 and the interface plate 24 in a fluid-tight manner, is inserted into this groove 64.

Finally, is should be noted that according to FIG. 7, the adapter mandrel 34 as well as the screws 42 are passed through the interface plate 24 with such a large clearance fit 68 that the relative alignment between interface plate 24 and adapter 22 results solely from the mentioned self-centering mechanism 48.

Furthermore, FIG. 7 shows that by means of an embossment 70 on the interface plate 24, the necessary clearance in the area of the radii of the two point-shaped elevations 54 and 60 on the adapter 22 is reduced.

What is claimed is:

1. A hydraulic unit of a vehicle braking system, comprising:
    a hydraulic housing;
    an adapter arranged on the hydraulic housing configured to couple a pedal travel transducer to the hydraulic housing; and
    an interface plate configured to fasten the pedal travel transducer provided on the adapter, the interface plate including a self-centering mechanism configured to precisely align the interface plate relative to the adapter,
    wherein the self-centering mechanism includes a first centering feature on the adapter for fixing the X-Y position of the interface plate in a main plane thereof,
    wherein the self-centering mechanism includes a second centering feature on the adapter configured to fix a rotational position of the interface plate in a main plane of the interface plate, and wherein the first centering feature is spaced from the second centering feature on the adapter.

2. The hydraulic unit according to claim 1, wherein the first centering feature is configured as a point-to-point fit.

3. The hydraulic unit according to claim 2, wherein the point-to-point fit includes a point-shaped elevation formed on the adapter and a point-shaped hole formed in the interface plate.

4. The hydraulic unit according to claim 1, wherein the second centering feature is configured as a point-to-line fit.

5. The hydraulic unit according to claim 1, further comprising:
    a seal which seals between the hydraulic housing and the interface plate.

6. The hydraulic unit according to claim 1, wherein the adapter includes an adapter mandrel that passes through the interface plate, wherein a clearance fit is formed between the interface plate and the adapter mandrel.

7. The hydraulic unit according to claim 1, wherein the interface plate is a deep-drawn component.

8. A hydraulic unit of a vehicle braking system, comprising:
    a hydraulic housing;
    an adapter arranged on the hydraulic housing configured to couple a pedal travel transducer to the hydraulic housing; and
    an interface plate configured to fasten the pedal travel transducer provided on the adapter, the interface plate including a self-centering mechanism configured to precisely align the interface plate relative to the adapter,
    wherein the self-centering mechanism includes a centering feature on the adapter configured to fix a rotational position of the interface plate in a main plane of the interface plate,
    wherein the centering feature is configured as a point-to-line fit, and
    wherein the point-to-line fit includes a point-shaped elevation formed on the adapter and a line-shaped hole formed in the interface plate.

* * * * *